United States Patent
Namou et al.

(10) Patent No.: US 9,985,452 B2
(45) Date of Patent: May 29, 2018

(54) APPARATUS FOR DISCHARGING A HIGH-VOLTAGE BUS

(71) Applicant: GM GLOBAL TECHNOLOGY OPERATIONS LLC, Detroit, MI (US)

(72) Inventors: Andrew J. Namou, West Bloomfield, MI (US); Mohammad N. Anwar, Van Buren Township, MI (US); Ahmad Albanna, Dearborn Heights, MI (US); Syed M. Kadry, Grand Blanc, MI (US)

(73) Assignee: GM Global Technology Operations LLC, Detroit, MI (US)

(*) Notice: Subject to any disclaimer, the term of this patent is extended or adjusted under 35 U.S.C. 154(b) by 141 days.

(21) Appl. No.: 15/059,961

(22) Filed: Mar. 3, 2016

(65) Prior Publication Data

US 2017/0256971 A1    Sep. 7, 2017

(51) Int. Cl.
    *H02J 7/00* (2006.01)

(52) U.S. Cl.
    CPC .......... *H02J 7/0065* (2013.01); *H02J 7/0068* (2013.01); *H02J 2007/0067* (2013.01)

(58) Field of Classification Search
    USPC .......................................... 320/136; 363/132
    See application file for complete search history.

(56) References Cited

U.S. PATENT DOCUMENTS

| | | | | |
|---|---|---|---|---|
| 3,372,683 A | * | 3/1968 | Phillips | F02P 3/0884 123/604 |
| 4,130,101 A | * | 12/1978 | Jundt | F02P 3/0556 123/630 |
| 2008/0252242 A1 | * | 10/2008 | Akama | H02P 6/06 318/400.14 |
| 2010/0250194 A1 | | 9/2010 | Newhouse et al. | |
| 2010/0315024 A1 | * | 12/2010 | Najima | H02M 7/53871 318/139 |
| 2011/0032652 A1 | * | 2/2011 | Shimada | H02M 5/293 361/91.2 |
| 2012/0187775 A1 | | 7/2012 | Nordstrom et al. | |
| 2013/0033684 A1 | * | 2/2013 | Saito | H05B 41/2881 353/85 |
| 2013/0033914 A1 | * | 2/2013 | Yahata | H02M 7/48 363/132 |
| 2013/0257446 A1 | * | 10/2013 | Soell | B60L 11/1803 324/503 |

(Continued)

*Primary Examiner* — Brian Ngo
(74) *Attorney, Agent, or Firm* — Quinn IP Law

(57) ABSTRACT

A discharge circuit for a high-voltage bus that is electrically connected to a high-voltage DC power source is described. The discharge circuit includes a discharge switch electrically connected in series with a discharge resistor between positive and negative conductors of the high-voltage bus, and the discharge switch includes a gate. A bi-stable switch includes a control gate, an input line that is electrically connected to the high-voltage bus and an output line that is electrically connected to the gate of the discharge switch. A trigger device is in communication with the control gate of the bi-stable switch. The input line of the bi-stable switch is electrically connected to the high-voltage bus, and the discharge switch is controllable to a closed state to provide an electric current flow path through the discharge resistor between the positive and negative conductors of the high-voltage bus in response to an activation signal.

18 Claims, 1 Drawing Sheet

(56) References Cited

U.S. PATENT DOCUMENTS

| | | | |
|---|---|---|---|
| 2013/0291833 A1* | 11/2013 | Eisen | F02P 3/053 123/406.12 |
| 2014/0176034 A1* | 6/2014 | Matsumura | B60L 3/003 318/430 |
| 2015/0097426 A1* | 4/2015 | Yamane | B60L 11/1803 307/10.1 |
| 2015/0097501 A1* | 4/2015 | Yamane | B60L 1/00 318/400.3 |
| 2015/0217640 A1* | 8/2015 | Bissontz | B60L 11/1868 307/9.1 |
| 2015/0231972 A1* | 8/2015 | Oi | B60L 3/04 307/10.1 |
| 2016/0064956 A1* | 3/2016 | Minesawa | B60L 3/02 320/166 |

* cited by examiner

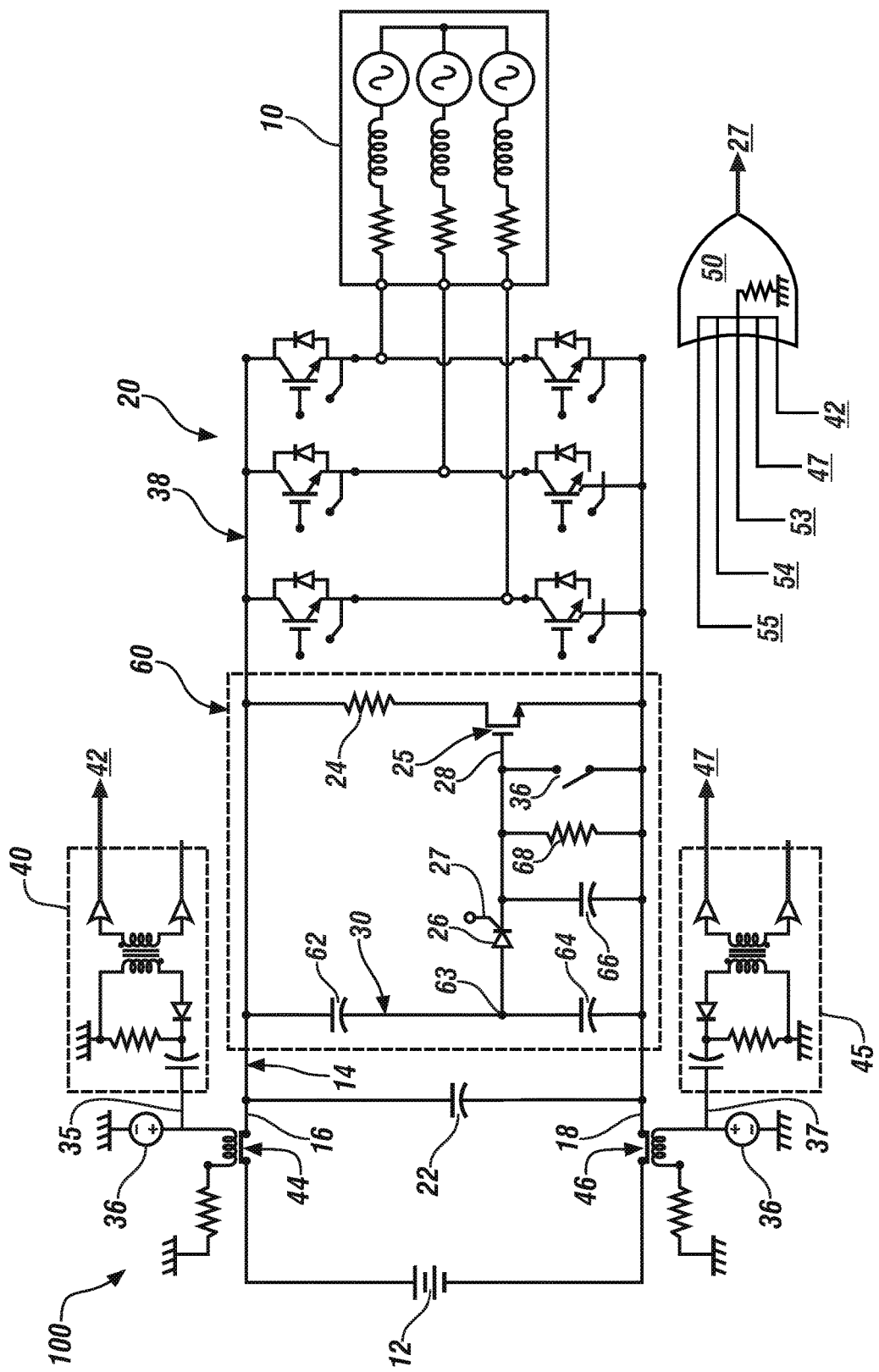

APPARATUS FOR DISCHARGING A HIGH-VOLTAGE BUS

TECHNICAL FIELD

The disclosure relates to discharging electrical energy stored on a high-voltage bus, including a system wherein the high-voltage bus transfers electric power to a power inverter.

BACKGROUND

Power inverter circuits may include a bulk capacitor that is arranged across a high-voltage bus to provide electrical stability and store supplemental electric energy. When the power inverter circuit is not in operation, or in certain other circumstances, it may be desirable to discharge the electric energy that is stored on the high-voltage bus including the bulk capacitor.

SUMMARY

A discharge circuit for a high-voltage bus that is electrically connected to a high-voltage DC power source is described. The discharge circuit includes a discharge switch electrically connected in series with a discharge resistor between positive and negative conductors of the high-voltage bus, and the discharge switch includes a gate. A bi-stable switch includes a control gate, an input line that is electrically connected to the high-voltage bus and an output line that is electrically connected to the gate of the discharge switch. A trigger device is in communication with the control gate of the bi-stable switch. The input line of the bi-stable switch is electrically connected to the high-voltage bus, and the discharge switch is controllable to a closed state to provide an electric current flow path through the discharge resistor between the positive and negative conductors of the high-voltage bus in response to an activation signal communicated from the trigger device to the control gate of the bi-stable switch.

The above features and advantages, and other features and advantages, of the present teachings are readily apparent from the following detailed description of some of the best modes and other embodiments for carrying out the present teachings, as defined in the appended claims, when taken in connection with the accompanying drawing.

BRIEF DESCRIPTION OF THE DRAWINGS

One or more embodiments will now be described, by way of example, with reference to the accompanying drawing, in which the FIGURE schematically illustrates an embodiment of a power inverter module including a high-voltage bus and a passive discharge circuit, wherein the high-voltage bus is electrically connected between a high-voltage DC electric power source and the power inverter module, in accordance with the disclosure.

DETAILED DESCRIPTION

Referring now to the drawing for the purpose of illustrating a non-limiting embodiment, the FIGURE schematically illustrates a power inverter module 20 that includes a passive discharge circuit 60 for discharging electric power across a high-voltage bus 14, wherein the high-voltage bus 14 is electrically connected between a high-voltage DC electric power source 12 and the power inverter module 20. The power inverter module 20 may be an element of an embodiment of a motor control system 100 that includes an electric machine 10 that is operatively controlled by the power inverter module 20 employing electric power from the high-voltage DC electric power source 12. In one non-limiting embodiment, the power inverter module 20 may be employed on a vehicle as an element of a propulsion system.

The electric machine 10 may be a motor/generator or another suitable multi-phase electric machine, e.g., a permanent magnet device. The power inverter module 20 electrically connects to the high-voltage DC electric power source 12 via a positive conductor 16 and a negative conductor 18 of the high-voltage bus 14. The high-voltage bus 14 may include first and second contactors 44, 46, respectively, that are controllable to connect the respective positive and negative conductors 16, 18 of the high-voltage bus 14 to positive and negative sides of the high-voltage DC electric power source 12. The first contactor 44 preferably communicates with a first trigger circuit 40, and the second contactor 46 preferably communicates with a second trigger circuit 45. The power inverter module 20 includes a bulk capacitor 22 electrically arranged between the positive conductor 16 and the negative conductor 18 of the high-voltage bus 14.

The first and second contactors 44, 46 are inductively-controlled normally-open switch devices that electrically connect to an ignition switch 36. When the ignition switch 36 is in a key-OFF state, the first and second contactors 44, 46 are open, thus preventing electric power flow between the respective positive and negative conductors 16, 18 and the high-voltage DC electric power source 12. When the ignition switch 36 is in a key-ON state, the first and second contactors 44, 46 are closed, thus permitting electric power flow between the respective positive and negative conductors 16, 18 and the high-voltage DC electric power source 12.

The power inverter module 20 includes an inverter 38 that includes a plurality of switch pairs that electrically connect in series between the positive and negative conductors 16, 18 of the high-voltage bus 14. Each of the switches of the switch pairs may be an Insulated Gate Bipolar Transistor (IGBT) having a diode arranged in parallel, or another suitable high-voltage switch, e.g., a Field-Effect Transistor (FET) or a Silicon-Carbide (SiC) FET. Each of the switch pairs corresponds to one of the phases of the electric machine 10. Other elements of the power inverter module 20 preferably include a plurality of gate drive circuits and a controller, wherein the gate drive circuits control activation and deactivation of the switches in response to control signals, e.g., pulsewidth-modulated control signals, which originate from the controller. The power inverter module 20 includes other electrical components including capacitors, resistors and other electrical circuit components to accomplish functions related to electrical noise suppression, load balancing and the like.

The first trigger circuit 40 includes a transformer or another inductive device that electrically connects to a signal line 35 electrically connected to a side of the first contactor 44 via a resistance-capacitance (RC) circuit and a diode. When the first contactor 44 is opened, e.g., in response to the ignition switch 36 changing to a key-OFF state, the signal line 35 changes from a discrete HIGH state to a discrete LOW state, which causes an inductive kickback in the first trigger circuit 40 that causes a first trigger signal 42. The activation signal may be a short-term inductively-induced impulse signal that includes a change from a low- or zero-voltage state to a high-voltage state. The first trigger signal 42 is communicated to a composite trigger gate 50.

The second trigger circuit 45 is analogous to the first trigger circuit 40, and includes a transformer or other inductive device that electrically connects to a signal line 37 electrically connected to a side of the second contactor 46 via a resistance-capacitance (RC) circuit and a diode. When the second contactor 46 is opened, e.g., in response to the ignition switch 36 changing to a key-OFF state, the signal line 37 changes from a discrete HIGH state to a discrete LOW state, which causes an inductive kickback in the second trigger circuit 45 that causes a second trigger signal 47. The second trigger signal 47 is communicated to the composite trigger gate 50.

The passive discharge circuit 60 is disposed between the positive conductor 16 of the high-voltage bus 14 and the negative conductor 18 of the high-voltage bus 14. The passive discharge circuit 60 includes a discharge switch 25 arranged in series with a discharge resistor 24, which preferably has a low impedance to facilitate discharging. The passive discharge circuit 60 further includes a capacitive divider circuit 30 that is electrically connected between the positive and negative conductors 16, 18 of the high-voltage bus 14, including a first capacitor 62 electrically connected in series with a second capacitor 64 at a first node 63.

The capacitive divider circuit 30 including the first capacitor 62 is electrically connected in series with the second capacitor 64 and splits the bus voltage into a suitable voltage level at the first node 63. A bi-stable switch 26 is electrically connected between the first node 63 and a gate 28 of the discharge switch 25. The bi-stable switch 26 may be a thyristor or another silicon-controlled rectifier, and includes a gate 27. The composite trigger gate 50 generates a discrete output signal that communicates with the gate 27. A thyristor is a solid-state semiconductor device having multiple layers of alternating N and P-type material that function as a bi-stable switch, conducting current when the gate 27 receives a current trigger signal, e.g., from the composite trigger gate 50. Once activated by a current trigger signal, the bi-stable switch 26 conducts current so long as the voltage across the bi-stable switch 26 is not reversed. The voltage level at the first node 63 is sufficient to activate the gate 28 to turn on or close the discharge switch 25 when the bi-stable switch 26 is activated. Other suitable bi-stable switch devices may be employed.

An RC circuit in the form of a third capacitor 66 arranged in parallel with a pull-down resistor 68 is arranged between the gate 28 of the discharge switch 25. The ignition switch 36 is also arranged between the gate 28 of the discharge switch 25 and the negative conductor 18 of the high-voltage bus 14.

The discharge switch 25 electrically connects in series with the discharge resistor 24 between the positive conductor 16 and the negative conductor 18. The discharge switch 25 in this embodiment may be an MOSFET device, a JFET device, or another suitable switching device. The discharge switch 25 includes a drain line, a source line and the gate 28.

The composite trigger gate 50 generates a discrete output signal that is communicated to the gate 27 of the bi-stable switch 26. The composite trigger gate 50 may be in the form of a multi-input logic device configured with a plurality of input lines and a discrete output line that communicates with the gate 27 of the bi-stable switch 26. The composite trigger gate 50 may be a logic OR gate or another suitable logic device. The input lines preferably include the first trigger signal 42, the second trigger signal 47, and a plurality of input signals associated with input lines 53, 54 and 55, including second, third and fourth activation signals. The second, third and fourth activation signals may originate from a vehicle controller, a service controller, an accelerometer, an airbag sensor or another suitable source.

The discrete output signal from the composite trigger gate 50 is preferably a discrete LOW value when all of the input lines 53, 54 and 55 have LOW values. This includes LOW values for the first trigger signal 42, the second trigger signal 47, and the second, third and fourth activation signals. When any one of the input lines 53, 54 and 55 has a HIGH value, the discrete output signal from the composite trigger gate 50 is a discrete HIGH value.

When the discrete output signal having a LOW value is communicated from the composite trigger gate 50 to the gate 27 of the bi-stable switch 26, no action occurs since the operation of the bi-stable switch 26 is not triggered by a LOW value at the gate 27.

When the discrete output signal having a HIGH value is communicated from the composite trigger gate 50 to the gate 27 of the bi-stable switch 26, the bi-stable switch 26 is triggered, and a voltage signal is communicated from the first node 63 through the bi-stable switch 26 to activate the control gate 28 of the discharge switch 25, which serves to turn on or close the discharge switch 25. As such, the discharge switch 25 is controllable to an open state between the positive and negative conductors 16, 18 of the high-voltage bus 14 when the ignition switch 36 is in the key-ON state and the second, third and fourth activation signals associated with the input lines 53, 54 and 55 are all low. The discharge switch 25 is controllable to a closed state to provide a low-impedance electric current flow path through the discharge resistor 24 between the positive and negative conductors 16, 18 of the high-voltage bus 14 when the ignition switch is in the key-OFF state, or when any one of the second, third and fourth activation signals associated with the input lines 53, 54 and 55 transitions to a high state.

The discharge resistor 24 may be sized based upon the magnitude of the electric potential across the high-voltage bus 14 and a preferred or desired discharge time. The average power rating may be reduced to a rating that comprehends peak power capability, and thus differs from resistances of devices employed in an active system. The discharge power, which drives the power rating of the discharge resistor 24, may be determined based upon the magnitude of the electric potential across the high-voltage bus 14, the preferred or desired discharge time, and the capacitance of the bulk capacitor 22. The design parameters for the discharge switch 25 may be determined based upon the magnitude of the electric potential across the high-voltage bus 14, electrical current, the preferred discharge time, and the resistance of the discharge resistor 24.

The capacitive divider circuit 30 including the first capacitor 62 electrically connected in series with the second capacitor 64 splits the bus voltage into a suitable voltage level at the first node 63. The third capacitor 66 is charged, using flow through and around the bi-stable-switch 26. The charged third capacitor 66 will activate the discharge path through a passive element. During vehicle shut down, airbag deployment or loss of 12V power supply, the inductive energy stored in the HV DC Relay's solenoid or other logic with a hard-wired OR gate may be employed to fire the bi-stable-switch 26 for a seamless, automatic disconnect link that allows for a rapid discharge of the HV energy storage in the bulk capacitor. The same architecture can be used in lower switches of the switch pairs of the inverter 20 in case there is a need for operation with a three-phase short condition. The architecture allows for robust discharge and provides maximum flexibility for circuit utilization for other functionalities. Various embodiments allow for the disconnect circuit to be driven via other novel signal arrangements along with the discharge resistor 24 being sized depending on the application.

This allows for quick, passive bus discharge without consuming any energy during vehicle usage (5 W vs 0.01 W) and without requiring any active control, thus remaining passive. The bi-stable switch 26 allows charging of the third capacitor 66 to drive the gate 28 of the discharge switch 25 only when it is required and naturally shut down voltage is near zero. The first and second capacitors 62, 64 are preferably sized to provide a voltage level that is sufficient to turn on the gate 28 and hold an electrical charge until the bulk capacitor 22 is discharged. Due to the ultrafast discharge, the discharge resistor 24 may have an average power rating that is reduced to a rating that is only related to peak power capability, thus requiring a small discharge resistor that takes a small amount of space. The pull down resistor 68 is sized to gradually discharge the gate capacitance and turn off the discharge switch 25.

The concepts described herein include a passive discharge circuit 60 that consumes little or no electrical energy while permitting rapid, automatic discharge of electric potential in the high-voltage bus 14 under certain conditions. The time period for rapid discharge may be less than five seconds in certain embodiments. Instead, the passive discharge circuit 60 operates with a naturally commutated bi-stable switch that requires no external power supply to operate. The passive discharge circuit 60 may prevent an over-discharge of the high-voltage DC electric power source 12 in a situation when the contactors 44, 46 become welded. The passive discharge circuit 60 may be responsive to operation in an uncontrolled generator (UCG) mode and may provide protection in the event of airbag deployment. The passive discharge circuit 60 may prevent inadvertent discharge of the high-voltage DC electric power source 12 which may otherwise be caused when the system is dropped or experiences a high g-force event when the ignition switch 36 is in the key-ON state.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. Data signals may include analog, discrete or digitized analog signals representing inputs from sensors, signals representing actuator commands, and communication signals between controllers. The term 'model' refers to a processor-based or processor-executable code and associated calibration that simulates a physical existence of a device or a physical process. Additionally, it is noted that the term "signal" means a detectable physical quantity that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A discharge circuit for a high-voltage bus that is electrically connected to a high-voltage DC power source, wherein the high-voltage bus includes positive and negative conductors, comprising:
   a discharge switch electrically connected in series with a discharge resistor between the positive and negative conductors of the high-voltage bus, wherein the discharge switch includes a gate;
   a bi-stable switch including a control gate, an input line that is electrically connected to the high-voltage bus and an output line that is electrically connected to the gate of the discharge switch; and
   a trigger device in communication with the control gate of the bi-stable switch;
   wherein the input line of the bi-stable switch is electrically connected to the high-voltage bus; and
   wherein the discharge switch is controllable to a closed state to provide an electric current flow path through the discharge resistor between the positive and negative conductors of the high-voltage bus in response to an activation signal communicated from the trigger device to the control gate of the bi-stable switch.

2. The discharge circuit of claim 1, wherein the trigger device further comprises a composite trigger gate having a plurality of input lines and an output line in communication with the control gate of the discharge switch.

3. The discharge circuit of claim 2, wherein the plurality of input lines includes a first trigger signal that is output from a first trigger circuit that is electrically connected to a signal line electrically connected to a first contactor that is electrically connected between the high-voltage DC power source and one of the positive and negative conductors of the high-voltage bus.

4. The discharge circuit of claim 3, wherein the first trigger circuit is in communication with an ignition switch.

5. The discharge circuit of claim 1, wherein the input line of the bi-stable switch electrically connected to the high-voltage bus comprises a capacitive divider electrically connected between the positive and negative conductors of the high-voltage bus, wherein the capacitive divider includes a first capacitor electrically connected in series with a second capacitor at a first node, and wherein the input line of the bi-stable switch is electrically connected to the first node.

6. The discharge circuit of claim 5, wherein the first capacitor and the second capacitor are sized to achieve a magnitude of voltage at the first node that activates the gate of the discharge switch when the bi-stable switch is activated.

7. The discharge circuit of claim 5, further comprising a pull-down resistor arranged in parallel with a third capacitor between the gate of the discharge switch and the negative conductor of the high-voltage bus.

8. The discharge circuit of claim 1, further comprising a bulk capacitor electrically connected between positive and negative conductors of the high-voltage bus, wherein the discharge switch is controllable to a closed state to provide an electric current flow path through the discharge resistor between the positive and negative conductors of the high-voltage bus to discharge the bulk capacitor.

9. The discharge circuit of claim 1, wherein the high-voltage bus electrically connects the high-voltage DC power source to a power inverter.

10. The discharge circuit of claim 1, wherein the discharge switch is a MOSFET device.

11. The discharge circuit of claim 1, wherein the bi-stable switch comprises a thyristor.

12. A power inverter disposed to control an electric machine, the power inverter being electrically connected to a high-voltage DC power source via a high-voltage bus, the power inverter comprising:
a multi-phase inverter circuit electrically connected to positive and negative conductors of the high-voltage bus;
a bulk capacitor electrically connected between the positive and negative conductors of the high-voltage bus; and
a discharge circuit for the high-voltage bus, including:
first and second contactors being controllable to electrically connect a respective one of the positive and negative conductors of the high-voltage bus to the high-voltage DC power source,
first and second trigger circuits in communication with a respective one of the first and second contactors,
a capacitive divider electrically connected between the positive and negative conductors, and including a first capacitor electrically connected in series with a second capacitor at a first node,
a discharge resistor electrically connected in series with a discharge switch between the positive and negative conductors,
a bi-stable switch electrically connected between the first node and a gate of the discharge switch, and
the first and second trigger circuits being in communication with a gate of the bi-stable switch,
wherein the first and second trigger circuits communicate with the gate of the bi-stable switch to control the discharge switch to an open state when the ignition switch is in a key-ON state, and
wherein the bi-stable switch controls the discharge switch to a closed state to provide a low-impedance electric current flow path through the discharge resistor between the positive and negative conductors of the high-voltage bus in response to an activation signal that is communicated to the bi-stable switch.

13. The power inverter of claim 12, wherein the discharge switch is controllable to the closed state to provide a low-impedance electric current flow path through the discharge resistor between the positive and negative conductors of the high-voltage bus in response to the ignition switch being in a key-OFF state.

14. The power inverter of claim 12, wherein the discharge switch is controllable to an open state to provide a high-impedance resistance to current flow through the discharge resistor between the positive and negative conductors of the high-voltage bus when the ignition switch is in a key-ON state and the input lines to the composite trigger gate are in a LOW state.

15. The power inverter of claim 12, wherein the power inverter electrically connects to an electric machine.

16. The power inverter of claim 12, wherein the discharge resistor comprises a resistor having an impedance that is selected to minimize time to discharge the bulk capacitor.

17. The power inverter of claim 12, wherein the bulk capacitor is electrically connected between the positive and negative conductors of the high-voltage bus in parallel with the discharge switch that is electrically connected in series with the discharge resistor.

18. A method for discharging electric power stored on a high-voltage bus, the method comprising:
activating, by a trigger device, a bi-stable switch in response to a trigger signal,
wherein the bi-stable switch includes an input line that is electrically connected to the high-voltage bus, wherein the input line is connected to a first node that connects a first capacitor electrically connected in series with a second capacitor between positive and negative conductors of the high-voltage bus;
wherein the bi-stable switch includes an output line that is electrically connected to a gate of a discharge switch; and
wherein the discharge switch is electrically connected in series with a discharge resistor between the positive and negative conductors of the high-voltage bus.

* * * * *